ABSTRACT OF THE DISCLOSURE

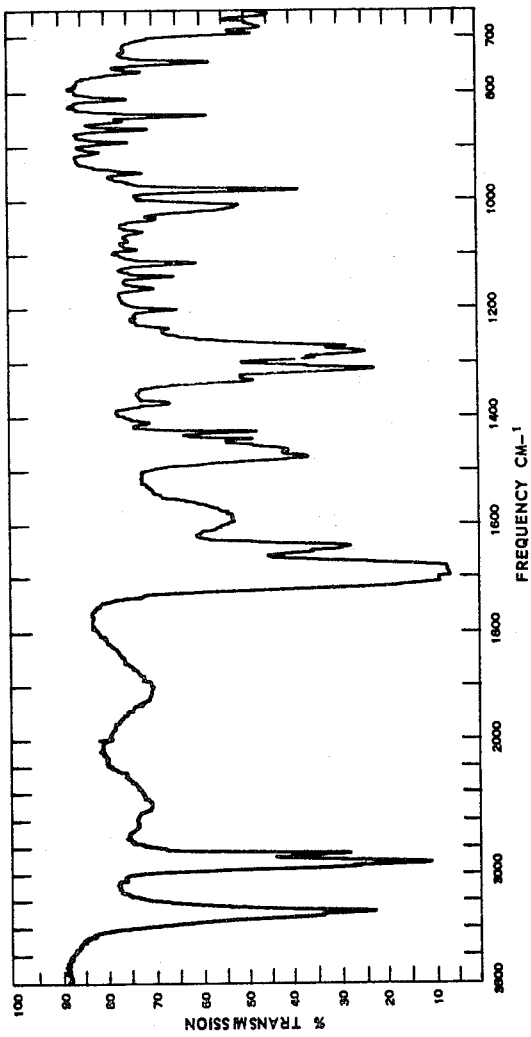

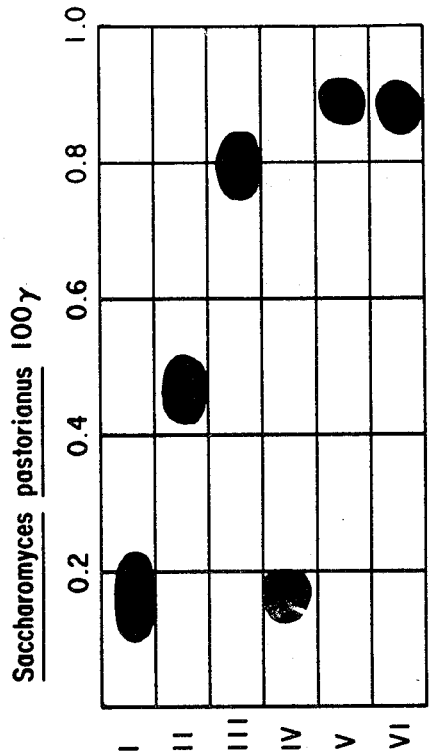
FIGURE II
PAPERGRAM PATTERN OF LIDIMYCIN 3,395,220
ANTIBIOTIC LYDIMYCIN AND PROCESS FOR PREPARING THE SAME USING *STREPTOMYCES LYDICUS*
Malcolm E. Bergy, John H. Coats, and Ladislav J. Hanka, Kalamazoo, Mich., assignors to The Upjohn Company, Kalamazoo, Mich., a corporation of Delaware
Filed Feb. 23, 1965, Ser. No. 434,434
8 Claims. (Cl. 424—117)

Antibiotic lydimycin which is produced in a microbiological fermentation by a lydimycin-producing strain of *Streptomyces lydicus*. Lydimycin is an anti-fungal agent. It can be used to control the filamentous fungi Glomerella sp. which is known to cause various diseases in fruits.

---

This invention relates to a novel composition of matter and to a process for the production thereof. More particularly, this invention relates to a new compound, lydimycin (U–15,965), and to a process for the preparation thereof.

Lydimycin is a biosynthetic product obtained by culturing a lydimycin-producing actinomycete in a suitable aqueous nutrient medium under aerobic conditions. Lydimycin inhibits the growth of *Nocardia asteroides, Blastomyces dermatitidis,* Geotrichum sp., *Phialophora varrucosa, Cryptococcus neoformans, Histoplasma capsulatum,* and *Trichophyton mentagrophytes.* Thus, lydimycin is useful alone or in combination with other antifungal or antibiotic agents to prevent the growth of, or reduce the number of, susceptible organisms present in various environments. Also, lydimycin is useful in wash solutions for sanitation purposes, as in the washing of hands and the cleaning of equipment, floors, or furnishings of contaminated rooms or mycological laboratories; it is also useful as an antifungal agent in industrial preservatives, for example, as an antifungal rinse for laundered clothes and for impregnating papers and fabrics; and it is useful for suppressing the fungal growth of sensitive organisms in plate assays and other biological media. It is distinguished from known antibiotic agents by its characteristic IR spectrum, shown in FIGURE 1; a characteristic papergram pattern, shown in FIGURE 11; molecular weight; elemental analysis; optical rotation; solubility; and antifungal spectrum.

Lydimycin is produced by the known actinomycete *Streptomyces lydicus,* NRRL 2433. This microorganism is described in U.S. Patent 3,160,560 for the production of the antibiotic streptolydigin.

The new compound of the invention is produced when the elaborating organism is grown in an aqueous nutrient medium under submerged aerobic conditions. It is to be understood that for the preparation of limited amounts surface cultures in bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, corn starch, lactose, dextrin, molasses, and like carbohydrate sources. Preferred nitrogen sources include cotton seed meal, yeast, autolyzed brewer's yeast with milk solids, pancreatic digestive casein, distiller's solubles, animal peptone liquors, meat and bone scraps, and like nitrogenous sources. Combination of these carbon and nitrogen sources can be used advantageously. Trace metals, for example, zinc, magnesium, manganese, cobalt, iron, and the like, need not be added to the fermentation media since tap water and unpurified ingredients are used as media components.

Production of the compound of the invention can be effected at any temperature conducive to the satisfactory growth of the microorganism, for example, between about 18° and 40° C. and preferably between about 26° and 35° C. Ordinarily, optimum production of the compound is obtained in from about 2 to 10 days. The media normally stays fairly close to neutral, or on the acidic side, during the fermentation. The final pH is dependent, in part, on the buffers present, and in part on the initial pH of the culture medium which is advantageously adjusted to about pH 6–8 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active, vegetative inoculum has thus been secured, it is transferred aseptically to large vessels or tanks. The medium in which the vegetative inoculum is produced can be the same as, or different from, that utilized for the production of the new compound as long as it is such that a good growth of the microorganism is obtained.

The new compound of the invention, lydimycin, is an acidic substance whose elemental analysis indicates the empirical formula $C_{10}H_{14}N_2O_3S$. Lydimycin is sparingly soluble in chloroform, methylene chloride, and like halogenated hydrocarbons; methanol, ethanol, and like alcohols; ethyl acetate, amyl acetate, butyl acetate, and like aliphatic esters; and acetone, methyl ethyl ketone, isopropyl butyl ketone, and like lower alkanones. Lydimycin is soluble in water to the extent of about 1 mg./ml. It is appreciably more soluble in water at a pH of about 6.0 or higher.

A variety of procedures can be employed in the isolation and purification of lydimycin, for example, solvent extraction, liquid-liquid distribution in a Craig apparatus, the use of adsorbents, and crystallization from solvents. A preferred method for the recovery of lydimycin is to utilize surface active adsorbents, for example, decolorizing carbon or decolorizing resins, and elute the adsorbed material with a solvent. Any of the solvents mentioned above can be used. A suitable decolorizing resin is Permutit DR (U.S. Patent 2,702,263). In a preferred recovery process, the mycelium from a lydimycin fermentation is separated from the broth by conventional means such as by filtration or centrifugation. The clarified beer is then passed through an activated carbon column and the column eluted by a gradiently mixed solvent system consisting of water and changing concentrations of a lower alkanone (acetone is preferred). The eluate from the column is concentrated to an aqueous solution and then freeze-dried to yield a dry preparation of lydimycin. This preparation can be readily mixed with other antibiotic agents for use in environments where a higher degree of purity of the antifugal is not essential.

A strongly basic anion exchange resin also can be used to recover lydimycin from the culture medium. Suitable anion exchange resins for this purpose are obtained by chloromethylating by the procedure given on pages 88 and 97 of Kunin, Ion Exchange Resins, 2d edition (1958), John Wiley and Sons, Inc., polystyrene cross-linked, if desired, with divinylbenzene, prepared by the procedure given on p. 84 of Kunin, supra, and quaternizing with trimethylamine or dimethylethanolamine by the procedure given on p. 97 of Kunin, supra. Anion exchange resins of this type are marketed under the trade names Dowex-1, Dowex-2, Dowex-3, Amberlite 1R-400, Duolite A-102, and Permutit S-1. The resin can be eluted as above and the eluate can be concentrated and freeze-dried as described above.

When higher purity lydimycin is desired, the freeze-dried preparation then can be subjected to further processing, advantageously by partition chromatography and solvent extraction. In a preferred purification process, a freeze-dried aqueous preparation of lydimycin is dissolved in an appropriate solvent system, consisting of solvents listed above, and passed through a partition chromatography column. Fractions are selected from the column and assayed for lydimycin. The highly active fractions are combined and concentrated to an aqueous solution from which crystallization commences. The lydimycin crystals then can be collected by filtration and dried. Fractions obtained from the above-described partition column which do not produce crystals can be distributed in a Craig apparatus using solvents disclosed above to further purify the material and thus induce the formation of lydimycin crystals. Lydimycin crystals obtained as above can be recrystallized from methanol to yield high purity lydimycin crystals.

Salts of lydimycin are formed employing the free acid of lydimycin and an inorganic or organic base. The lydimycin salts can be prepared, as for example, by dissolving lydimycin free acid in water, adding a dilute base until the pH of the solution is about 7 to 8 and freeze-drying the solution to provide a dried residue consisting of the lydimycin salt. Lydimycin salts which can be formed include the ammonium, sodium, potassium, and calcium salts. Other salts of lydimycin, including those with organic bases such as primary, secondary, and tertiary monoamines, as well as with polyamines, also can be formed using the above-described or other commonly employed procedures. Other valuable salts are obtained with therapeutically effective bases which impart additional therapeutic effects thereto. Such bases are, for example, the purine bases such as theophyllin, theobromin, caffeine, or derivatives of such purine bases; antihistaminic bases which are capable of forming salts with weak acids; pyridine compounds such as nicotinic acid amide, isonicotinic acid hydrazide and the like; phenylalkylamines such as adrenalin, ephedrin, and the like; choline, and others. Salts of lydimycin can be used for the same biological purposes as the free acid.

Lydimycin has antifungal activity as shown in Table I. The antifungal spectrum was determined by an agar dilution plate assay.

TABLE I.—ANTIFUNGAL ACTIVITY OF LYDIMYCIN

| Test organism: | Minimum inhibitory concentration in $\mu$/ml. |
|---|---|
| Nocardia asteroides | 100 |
| Blastomyces dermatitidis | 1000 |
| Coccidioides immitis | 1000 |
| Geotrichum sp. | 100 |
| Phialophora verrucosa | 100 |
| Cryptococcus neoformans | 1000 |
| Histoplasma capsulatum | 1000 |
| Sporotrichum schenckii | 1000 |
| Monosporium apiospermum | 1000 |
| Trichophyton rubrum | 1000 |
| Candida albicans Abbott | 100 |
| Trichophyton violaceum | 1000 |
| Trichophyton asteroides | 100 |
| Trichophyton mentagrophytes | 100 |

Lydimycin has an antibacterial spectrum as shown in Table II. The antibacterial spectrum was determined by the disc plate agar diffusion test using 13 mm. size discs.

TABLE II.—ANTIBACTERIAL ACTIVITY OF LYDIMYCIN

| Test organism: | Zone size (mm.) |
|---|---|
| Bacillus subtilis (hazy) | 16 |
| Sarcina lutea (hazy) | 24 |
| Staphylococcus aureus | 40 |
| Streptococcus faecalis | 22 |
| Mycobacterium phlei | 28 |
| Salmonella gallinarum | 21 |
| Rhodopseudomonas spheroides | 33 |
| Chromobacterium violaceum (hazy) | 25 |

Lydimycin is also active against the filamentous fungi *Glomerella* sp. and *Penicillium oxalicum*, and the yeasts *Saccharomyces cerevisiae*, *Saccharomyces pastorianus*, and *Trigonopsis variabilis*.

Lydimycin can be used to control the filamentous fungi *Glomerella* sp. which is known to cause bitter-rot of apple (Malus), wither-tip of the twigs and tear stain of the fruits of orange (Citrus), anthracnose of mango (Mangifera), and avocado (Persea). Lydimycin also can be used as the antifungal agent in the shoe uppers disclosed in U.S. Patent 3,130,505. Further, lydimycin can be used to control *S. gallinarum* in livestock and poultry, and *S. aureus* on washed and stacked food utensils.

The following examples are illustrative of the process and products of the present invention but are not to be construed as limiting. All percentages are by weight and all solvent mixture proportions are by volume unless otherwise noted.

EXAMPLE 1

*Lydimycin*

A. FERMENTATION

A soil stock of *Streptomyces lydicus*, NRRL 2433, was used to inoculate a series of 500-ml. Erlenmeyer flasks containing 100 ml. of seed medium consisting of the following ingredients:

| | |
|---|---|
| Glucose monohydrate | grams__ 25 |
| Pharmamedia [1] | do____ 25 |
| Tap water q.s. 1 liter. | |

[1] Pharmamedia is an industrial grade of cottonseed flour produced by Traders Oil Mill Co., Fort Worth, Tex.

The seed inoculum was grown for 2 days at 28° C. on a Gump rotary shaker operating at 250 r.p.m.

Seed inoculum (5 ml.), described above, was used to inoculate a 500-ml. Erlenmeyer flask containing 100 ml. of the following sterile fermentation medium.

| | |
|---|---|
| Glucose monohydrate | grams__ 10 |
| Dextrin | do____ 20 |
| Pabst yeast [1] | do____ 10 |
| Cottonseed meal | do____ 10 |
| Lard oil | ml__ 1 |
| Tap water q.s. 1 liter. | |

[1] Brewers yeast obtained from the Pabst Brewing Company.

The fermentation flask was grown for 144 hours at a temperature of 32° C., on a Gump rotary shaker operating at 250 r.p.m. At harvest, the beer assayed 19.2 biounits/ml. against *S. pastorianus*.

B. RECOVERY

The whole beer from a series of fermentation flasks, as disclosed above (920 ml. assaying 9.4 biounits/ml. of lydimycin against the organism *S. pastorianus*), was adjusted to pH 4.0 with sulfuric acid and filtered with the aid of diatomaceous earth. The filter cake was washed with 0.1 beer-volume of water and discarded. The filtered broth was then passed through a column containing 27.1 grams (3% w./v.) of granulated activated charcoal (Pittsburgh Coke and Chemical Company, Pittsburgh, Pa.) at a flow rate of approximately 3.5 ml./min. The carbon was then washed with 60 ml. of deionized water and the effluent discarded. The carbon column was eluted in place by a gradiently mixed solvent consisting of 400 grams of 50% aqueous acetone, and 400 grams of acetone. In this elution system, the 50% aqueous acetone was the first to contact the carbon. The flow rate during the elution cycle was 4 ml./min.; 20-ml. fractions were collected. Fractions 64 through 100 were combined, concentrated to an aaqueous solution by vacuum distillation, and freeze-dried; yield, 490 mg. of lydimycin assaying 12.0 biounits/mg. against *S. pastorianus*. This procedure was the basis for successful scale-ups.

C. PARTITION CHROMATOGRAPHY OF LYDIMYCIN PREPARATION

The solvent system used in the partition chromatography column consisted of ethyl acetate:cyclohexane:pH 3.0 McIlvaine's buffer (15:4:1). The column bed was prepared by slurrying 1000 grams of sulfuric acid-washed diatomaceous earth in upper phase and homogenizing it with 400 ml. of lower phase. The mixture was poured into a 3-inch (I.D.) glass chromatography column and packed to a constant height of approximately 30 inches using 2 to 3 pounds air pressure. Lydimycin (130 grams), designated lydimycin Preparation I, prepared as described above, was dissolved in 100 ml. of lower phase. The solution was adjusted to pH 3.0 with concentrated hydrochloric acid and then homogenized with 200 grams of diatomaceous earth and enough upper phase to provide a flowing mixture. This mixture was added to the top of the column bed and the liquid level was drained to the diatomaceous earth level. Fresh solvent system upper phase was added, and the column was developed at a flow rate of approximately 200–400 ml./min. One liter fractions were collected and assayed against *S. pastorianus*. Fractions having a potency greater than 50 biounits/mg. of lydimycin were combined, concentrated to 50 ml. of aqueous solution (pH 2.5–3.0), and stored at 40° F. for one day. Lydimycin acid crystals were then removed by filtration and dried in vacuo; yield, 160 mg. assaying 1617 biounits/mg., *S. pastorianus*. The crystals were recrystallized by dissolving 157 mg. of crystals in 90 ml. of boiling methanol. The solution was filtered and then evaporated by boiling to a volume of 20 ml. The concentrate was cooled to 0° C. for two hours and lydimycin crystals were removed by filtration and dried; yield, 125 mg. assaying 1917 biounits/m., *S. pastorianus*.

Lydimycin preparations obtained from the partition chromatography column, as described above, which are not crystalline can be obtained in the crystalline form by distribution in a Craig countercurrent distribution apparatus using a solvent system consisting of 1-butanol:methyl ethyl ketone:water (1:1:2). Contents of the tubes containing the major portion of lydimycin are combined and concentrated in vacuo at less than 50° C. to an aqueous solution. The pH of this aqueous solution is adjusted to pH 3.0 and the solution allowed to stand at room temperature for 2 hours. Lydimycin crystals are then removed by filtration, washed with water, and dried to a constant weight in vacuo at 40° C.

EXAMPLE 2

*Ammonium salt of lydimycin*

Lydimycin free acid (18.85 mg.), prepared as in Example 1, was dissolved in 5 ml. of water to which was added concentrated ammonium hydroxide to a pH of 8.0. The solution was then freeze-dried to yield 13.9 mg. of lydimycin ammonium salt assaying 1612 biounits/mg. *S. pastorianus*.

A biounit, as used throughout this specification, is that amount of antibiotic which, when dissolved in 0.88 ml. of the test solution and applied to a 12.7 mm. disc, gives a 20 ml. zone of inhibition under standard conditions of the disc-plate assay.

CHEMICAL AND PHYSICAL PROPERTIES OF LYDIMYCIN

Crystalline lydimycin has the following physical and chemical properties:

Color: White.
Elemental analysis: C=49.68; H=6.04; O=20.01; N=11.38; S=12.84.
Empirical formula: $C_{10}H_{14}N_2O_3S$.
Optical rotation: $[\alpha]_D^{25} = +92°$ (c.=0.70 in 0.1 M $KH_2PO_4$, pH 7.0 buffer).
Molecular weight: 242, as determined by mass spectroscopy.
Titration: pKa'=4.32.
Equivalent weight: 244, as determined by titration.
Ultraviolet spectrum: Lydimycin shows no absorption maxima in acidic, neutral, or basic aqueous solution between 220–400 mu.
Infrared spectrum: The infrared absorption spectrum of lydimycin suspended in mineral oil mull is reproduced in FIGURE 1 of the drawing. Lydimycin shows bands at the following wave-lengths expressed in reciprocal centimeters:

| | |
|---|---|
| 3320 (M—medium) | 1283 (S) |
| 3290 (S—small) | 1273 (S) |
| 2950 (M) (oil) | 1238 (W) |
| 2920 (S) (oil) | 1203 (W) |
| 2850 (M) (oil) | 1163 (W) |
| 2640 (W—wide) | 1142 (W) |
| 2500 (W) | 1118 (W) |
| 2400 (W) | 1093 (W) |
| 2310 (W) | 1077 (W) |
| 1910 (W) | 1060 (W) |
| 1711 (S) | 1035 (W) |
| 1695 (S) | 1010 (M) |
| 1654 (M) | 982 (M) |
| 1645 (S) | 949 (W) |
| 1590 (M) | 910 (W) |
| 1479 (M) | 890 (W) |
| 1465 (M) | 867 (W) |
| 1444 (M) | 852 (W) |
| 1430 (M) | 841 (M) |
| 1413 (M) | 810 (W) |
| 1378 (W) (oil) | 760 (W) |
| 1335 (M) | 743 (M) |
| 1315 (S) | 690 (M) |
| 1308 (M) | 683 (M) |
| 1294 (M) | 655 (M) |

Band intensities are indicated as "S," "M," and "W," respectively, and are approximated in terms of the intensity of the bands. "S" bands are bands of small intensity; "M" bands are bands of medium intensity; and "W" bands are bands of wide intensity.

Lydimycin has a characteristic papergram pattern as shown in FIGURE 11 of the drawing when using the following solvent systems:

I. 1-butanol, water (86:16), 16 hours.
II. 1-butanol, water (84:16), plus 0.25% p-toluenesulfonic acid, 16 hours.
III. 1-butanol, acetic acid, water (2:1:1), 16 hours.
IV. 2% piperidine (v./v.) in 1-butanol, water (84:16), 16 hours.
V. 1-butanol, water (4:96), 5 hours.
VI. 1-butanol, water (4:96), plus 0.25% p-toluenesulfonic acid, 5 hours.

We claim:
1. A compound, lydimycin, which is substantially free from streptolydigin, and
(a) is effective in inhibiting the growth of various fungi;
(b) is sparingly soluble in lower alcohols, acetone, ethyl acetate, and chlorinated hydrocarbons; and which in its essentially pure free acid form

(c) has the following elemental analyses: C, 49.68; H, 6.04; O, 20.01; N, 11.38; S, 12.84;
(d) has a molecular weight of 242, as determined by mass spectroscopy;
(e) has no ultraviolet absorption maxima between 220 and 400 mμ;
(f) has a characteristic infrared absorption spectrum as shown in FIGURE 1 of the accompanying drawing; and
(g) has a characteristic papergram pattern as shown in FIGURE 11 of the drawing.

2. A compound as defined in claim 1, lydimycin, in its essentially pure form.

3. A compound as defined in claim 1, lydimycin, in its essentially pure crystalline form.

4. A compound selected from the group consisting of lydimycin, according to claim 1, and salts thereof with alkali metals, alkaline earth metals, and amines.

5. Ammonium salt of lydimycin, the compound defined in claim 1.

6. A process which comprises cultivating *S. lydicus*, NRRL 2433, in an aqueous nutrient medium under aerobic conditions until substantial antifungal activity is imparted to said medium by production of lydimycin, the compound defined in claim 1, and isolating the lydimycin essentially free of streptolydigin.

7. A process which comprises cultivating *S. lydicus*, NRRL 2433, in an aqueous nutrient medium containing a source of assimilable carbohydrate and assimilable nitrogen under aerobic conditions until substantial antifungal activity is imparted to said medium by production of lydimycin, the compound defined in claim 1, and isolating the lydimycin so produced essentially free of streptolydigin.

8. A process according to claim 7 in which the isolation comprises filtering the medium, adsorbing the lydimycin, the compound defined in claim 1, on a surface active agent, and recovering lydimycin from the adsorbent.

References Cited

UNITED STATES PATENTS 3,160,560  12/1964  De Boer et al. _____ 167—65

ALBERT T. MEYERS, *Primary Examiner.*

D. M. STEPHENS, *Assistant Examiner.*